United States Patent
Nagamoto

[11] Patent Number: 6,102,274
[45] Date of Patent: Aug. 15, 2000

[54] METHOD FOR MANUFACTURING GOLF CLUB HEADS

[75] Inventor: Itsushi Nagamoto, Hamamatsu, Japan

[73] Assignee: Yamada Corporation, Shizouka, Japan

[21] Appl. No.: 08/956,211

[22] Filed: Oct. 22, 1997

[30] Foreign Application Priority Data

Oct. 22, 1996 [JP] Japan .................................. 8-279237

[51] Int. Cl.[7] .......................... B23K 31/02; B23K 20/12; A63B 53/02
[52] U.S. Cl. .................................... 228/114.5; 228/114.5; 473/312
[58] Field of Search ................. 228/114.5, 2.3; 473/312, 305, 349; 273/80

[56] References Cited

U.S. PATENT DOCUMENTS

| | | | |
|---|---|---|---|
| 2,993,695 | 7/1961 | Birch et al. | 273/80.5 |
| 3,410,558 | 11/1968 | Reuter | 273/80.2 |
| 3,614,101 | 10/1971 | Hunter et al. | 273/80.2 |
| 3,941,390 | 3/1976 | Hussey | 273/169 |
| 3,973,715 | 8/1976 | Rust | 228/112 |
| 5,165,688 | 11/1992 | Schmidt et al. | 273/80 |
| 5,257,807 | 11/1993 | Baumann et al. | 473/312 |
| 5,275,399 | 1/1994 | Schmidt et al. | 273/80 |
| 5,314,106 | 5/1994 | Ambroziak et al. | 228/114.5 |
| 5,374,062 | 12/1994 | Kochevar | 473/312 |
| 5,409,220 | 4/1995 | Lombardo | 473/312 |
| 5,505,795 | 4/1996 | Tsai et al. | 148/527 |
| 5,569,097 | 10/1996 | Veux et al. | 473/292 |
| 5,611,740 | 3/1997 | Nagamoto | 473/305 |
| 5,620,652 | 4/1997 | Tack et al. | 420/532 |
| 5,669,825 | 9/1997 | Shira | 473/324 |
| 5,709,614 | 1/1998 | Horiba | 473/305 |
| 5,766,089 | 6/1998 | Dekura | 473/305 |
| 5,769,307 | 6/1998 | Takeda | 228/114.5 |
| 5,885,170 | 3/1999 | Takeda | 473/306 |

FOREIGN PATENT DOCUMENTS

H8-215350  8/1996  Japan .

OTHER PUBLICATIONS

AWS Welding Handbook, vol. 1, 8th ed. pp. 19–20, 1991.

Primary Examiner—Patrick Ryan
Assistant Examiner—Lynne Edmondson
Attorney, Agent, or Firm—Koda & Androlia

[57] ABSTRACT

A method for manufacturing a golf club head comprising the steps of abutting a joining end surface of a hosel to a joining end surface of a ball-striking member, rotating the hosel while the ball-striking member and the hosel are under pressing contact, thus heating the joining end surfaces of the two members by the heat of friction generated between the joining end surfaces, stopping the rotation of the hosel, and then applying a further, stronger pressure to the joining end surfaces, thus joining them together so as to form the ball-striking member and the hosel into an integral, single unit.

13 Claims, 4 Drawing Sheets

METHOD FOR MANUFACTURING GOLF CLUB HEADS

BACKGROUND OF THE INVENTION

1. Field of the Invention

The present invention relates to a method for manufacturing golf club heads and more particularly to a method for manufacturing metal golf club heads such as iron club heads and metal-wood club heads.

2. Prior Art

Some conventional golf club heads of irons and metal-woods are obtained from a ball-striking part and a hosel part (called "hosel") which are two independent pieces formed separately from different materials and then joined into an integral unit. This type of club head is disclosed in, for instance, Japanese Patent Application Laid-Open (Kokai) No. H8-215350 which was filed by the applicant of the present patent application.

In this prior art which is described for an iron club head, the overall weight of the head is lightened, the center of gravity is lowered, and the cost of the head is reduced by use of a metal material having a relatively large specific gravity such as carbon steel (Fe), stainless steel (SUS), a beryllium-copper alloy (Be—Cu), tungsten carbide (WC) or the like for the ball-striking member and a metal material having a relatively small specific gravity such as titanium (Ti), a titanium alloy, aluminum (Al), an aluminum alloy or the like for the hosel. Because of these materials, the hosel can be endowed with interchangeability; and as a result, it is possible to make variations in terms of ball-striking performance and external appearance.

In the golf club having a head as described above, the ball-striking part and the hosel are brought together under a convex-concave type interlocking relationship between the joining end surface of the ball-striking part and the joining end surface of the hosel, and then the outer circumference of the joint boundary area between the two members are welded. However, such an interlocking relationship of the ball-striking part and hosel would not necessarily provide a perfectly aligned engagement between the two. In addition, since only the outer circumference of the joint boundary area between the two members is welded, the welded area tends to locate only at the circumferential edges of the respective joining end surfaces and would not extend throughout the interior portions of the joint portion. Thus, the above joining method does not provide a complete joint structure.

As a result, it is likely that the welded area between the ball-striking part and the hosel can be destroyed by the impact of striking the ball during long-term repeated use, and the two members become loosened, causing a danger that the ball-striking part may fall off of the hosel.

SUMMARY OF THE INVENTION

Accordingly, the object of the present invention is to provide a method for manufacturing a golf club head which provides a complete joint of a ball-striking part and a hosel.

The object of the present invention is accomplished by unique steps in a method for manufacturing a golf club head in which a ball-striking part and a hosel, which are separate members of different types of metal materials, are joined together, and the method comprises the steps of: bringing the joining end surface of the hosel to abut against the joining end surface of the ball-striking part, rotating the joining end surface of the hosel relative to the joining end surface of the ball-striking part while both of them are in a pressing contact so that the respective joining end surfaces are heated by the heat of friction generated between the two members; stopping the rotation; and then applying a further pressure to the two members so as to weld the joining end surfaces together.

After welding the ball-striking part and hosel, a thick portion formed around the outer circumference of the joint area between the two members during the rotation and application of the pressures is ground away. On the other hand, an insertion hole is formed so as to extend through the joint area between the ball-striking part and hosel, and a rod-form member is inserted into this insertion hole and joined thereto.

A preliminary hole that is smaller in diameter than the insertion hole for the rod-form member may be formed beforehand in the hosel, thus facilitating the boring work for the insertion hole.

The rod-form member is a club shaft or a weight adjusting member, and it can also be a reinforcing member. The rod-form member used as the weight adjusting member is a metal having a relatively large specific gravity such as tungsten or the like when a sizable weight adjustment is required; and a metal having a relatively small specific gravity such as aluminum or the like is used for the weight adjusting member when a small weight adjustment is required. The weight adjusting member is inserted into the insertion hole and joined thereto by an adhesive agent or the like before inserting and joining the club shaft. For the reinforcing member, it is preferable to use the same material as that of the ball-striking part or hosel.

DETAILED DESCRIPTION OF THE INVENTION

Figure 1:
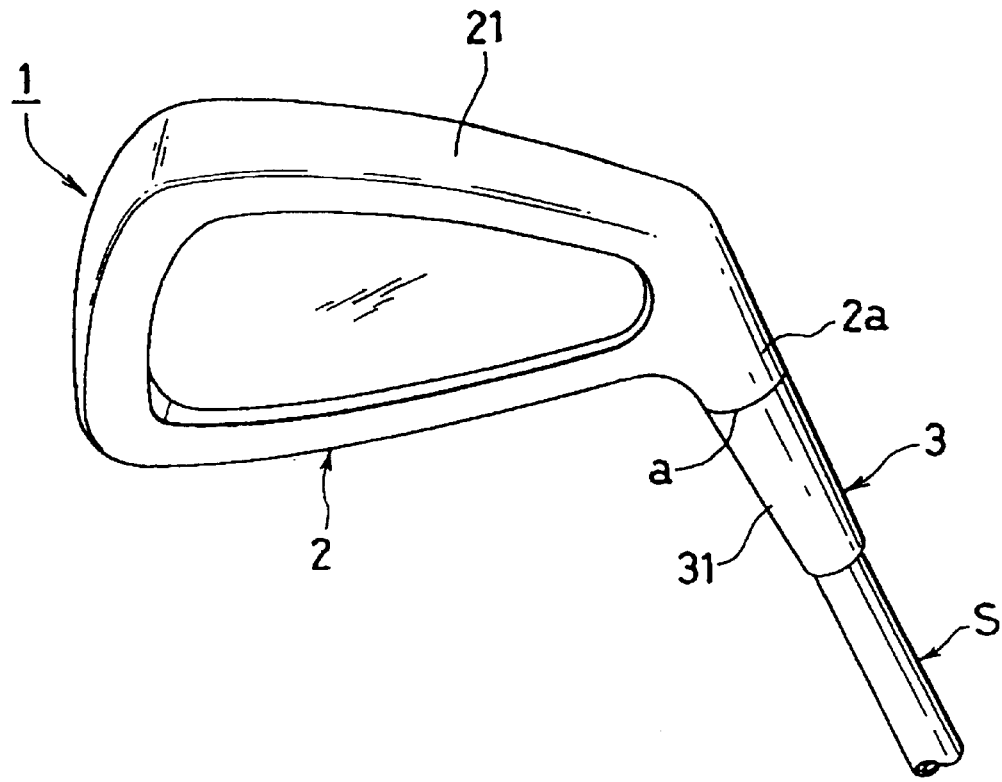
FIG. 1 is a perspective view of a golf club according to the present invention.

Embodiments of the present invention will be described below in detail with reference to the accompanying drawings; and in the embodiments, an iron club head is shown as an example, and the numeral 1 generally refers to a club head main body.

The club head main body 1 comprises a ball-striking part 2 and a hosel 3, and they are formed separately from different types of metal materials and joined together into an integral unit by the manufacturing method which will be described below.

The ball-striking member 21 of the ball-striking part 2 is obtained from a metal material which has a relatively large specific gravity such as carbon steel (Fe), stainless steel (SUS), a beryllium-copper alloy (Be—Cu), tungsten carbide (WC), or the like; while a hosel member 31 of the hosel 3 is formed from a metal material which has a relatively small specific gravity such as titanium (Ti), a titanium alloy, aluminum (Al), an aluminum alloy, or the like.

Figure 2:
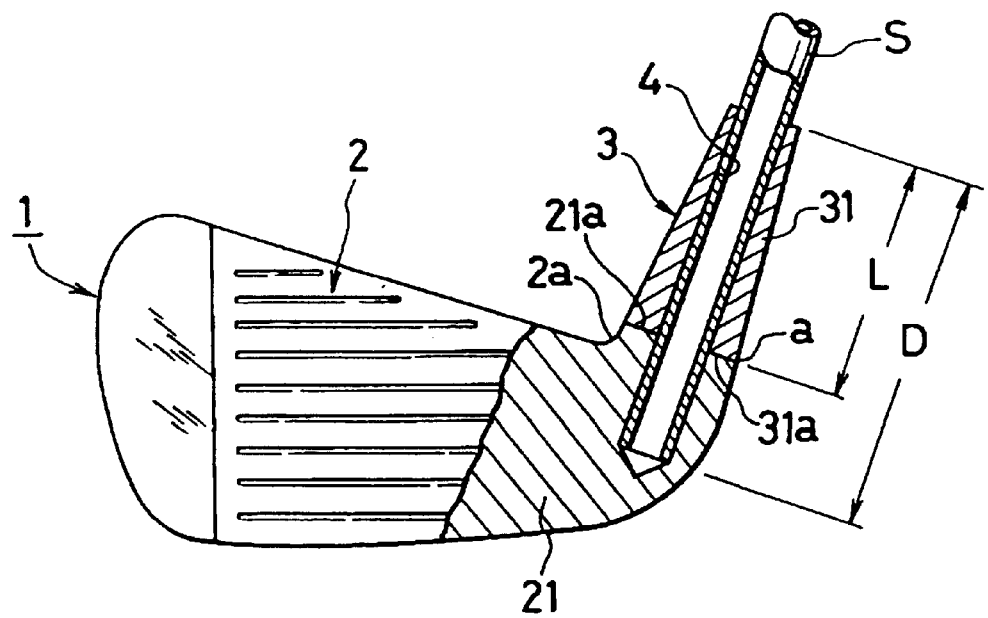
FIG. 2 is a vertical partial cross section showing the essential section of a club head main body of the first embodiment of the present invention.

As shown in the first embodiment of the head joint structure illustrated in FIG. 2, an insertion hole 4 into which a club shaft S, which is a rod-form member, is formed in the head main body 1. This insertion hole 4 extends through the hosel member 31 toward the heel-side base end portion of the ball-striking member 21 so that the insertion hole 4 passes through the joint area a which is between the heel-side base end portion 2a of the ball-striking part 2 and the hosel 3. In other words, the insertion hole 4 is formed so that its depth D is greater than the length L of the hosel member 31 (D>L). Accordingly, the club shaft S is inserted into the insertion hole 4, passes through the joint area a, and then connected to the club head main body 1 by an adhesive agent or the like.

Figure 3:
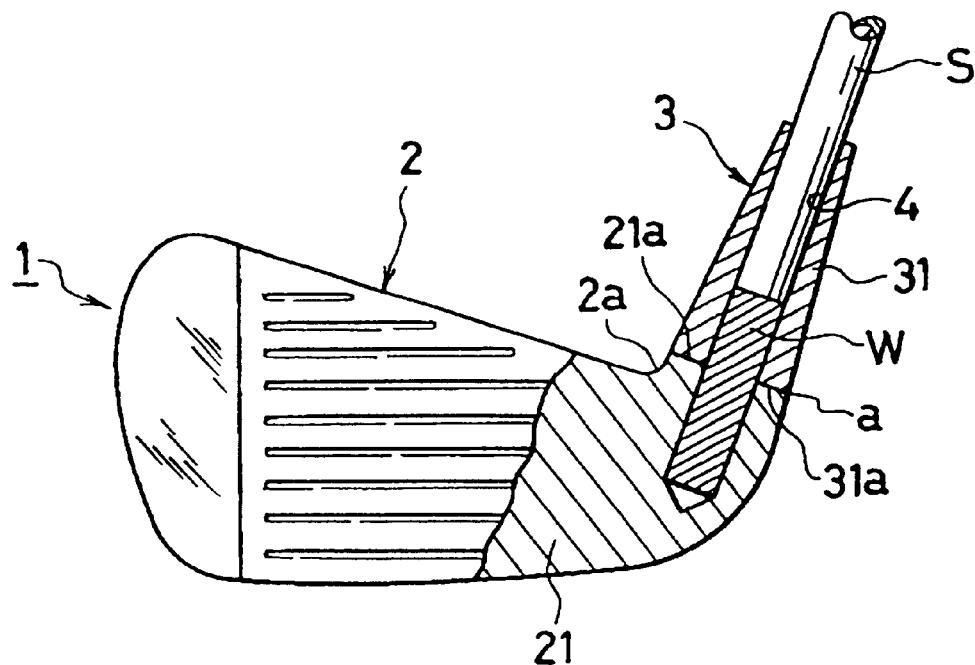
FIG. 3 is a vertical partial cross section showing the essential section of the head main body of the second embodiment of the present invention.

FIG. 3 illustrates the second embodiment of the head joint structure of the present invention.

In this embodiment, the rod-form member is a weight adjusting member W of a cylindrical shape and is inserted into the insertion hole 4 and connected to the head main body 10 so that the weight adjusting member W passes through the joint area a. In cases where an extended weight adjustment is required, a metal material with a relatively large specific gravity such as carbon steel, tungsten or the like is used for this weight adjusting member W. On the other hand, in cases where merely a small amount of weight adjustment is required, a metal material with a relatively small specific gravity such as aluminum or the like is used for the weight adjusting member W. The weight adjusting member W is inserted into the insertion hole 4 and connected to the club head main body 1 by an adhesive agent, etc. before the club shaft S is inserted and connected.

Next, the manufacturing process of the iron club head will be described with reference to FIGS. 4 through 7.

Figure 4:
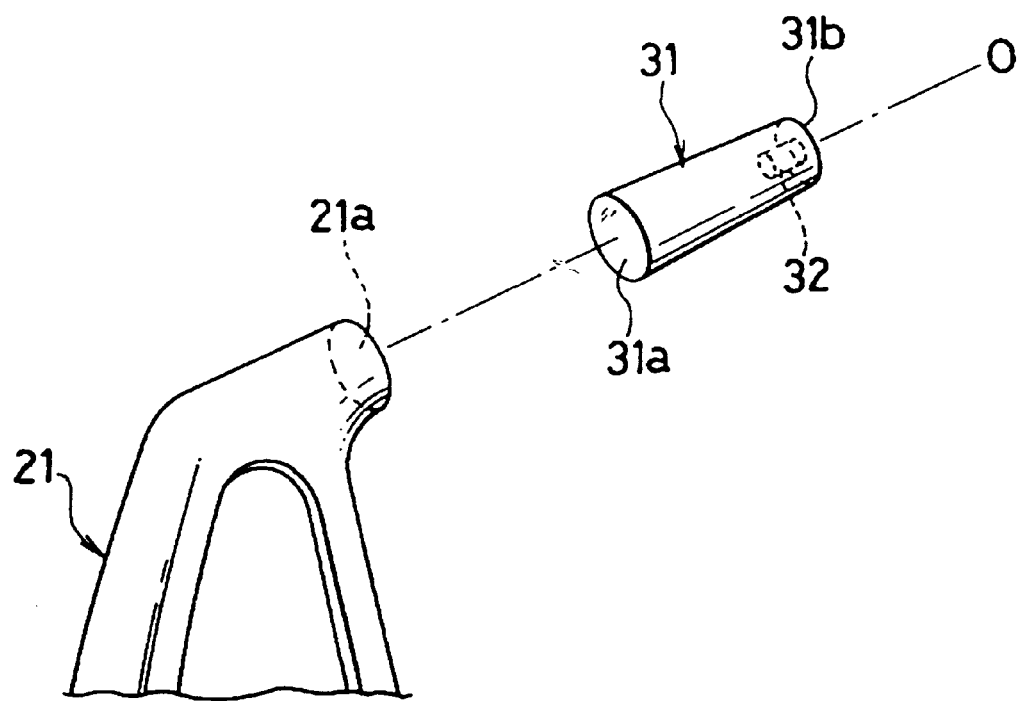
FIG. 4 separately shows the ball-striking part and the hosel to be connected to each other according to the present invention.

First, as shown in FIG. 4, the ball-striking member 21 which forms the ball-striking part 2 and the hosel member 31 which forms the hosel 3 are separately formed from different types of metal materials as described above.

Figure 5:
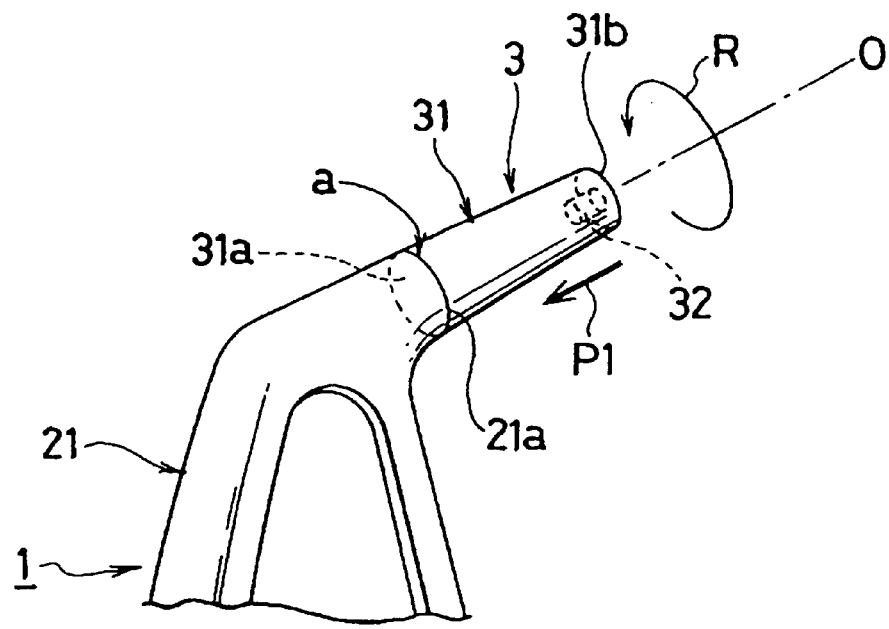
FIG. 5 shows the hosel abutted to the ball-striking part during the manufacturing method of the present invention.

Then, as shown in FIG. 5, the ball-striking member 21 is held in a fixed jig (not shown), and the hosel member 31 is held in a rotating jig (not shown); and the joining end surface 31 a of the hosel member 31 is brought to abut against the joining end surface 21 a of the ball-striking member 21 with the respective central axes O coinciding with each other. While being pressed against each other, the hosel member 31 is rotated relative to the ball-striking member 21 in the direction R by the rotating jib while a pressure of PI is applied.

When the ball-striking member 21 and hosel member 31 are brought, as described above, to abut against each other, the respective joining end surfaces 21a and 31a are brought into contact under a surface to surface (or flat-surface) relationship; and it is also possible to bring them into contact under an interlocking (convex-concave) engagement as in the prior art.

As described above, the ball-striking member 21 is fixed by the fixed jig so as not to be rotated and only the hosel member 31 is rotated in the direction of R. It is, however, also possible to rotate the ball-striking member 21 in the opposite direction from the rotational direction R of the hosel member 31. The relative rotational speed employed is approximately 500 to 3,000 rpm, and the pressure P1 applied during the rotation is approximately 3 to 5 tons.

Figure 6:
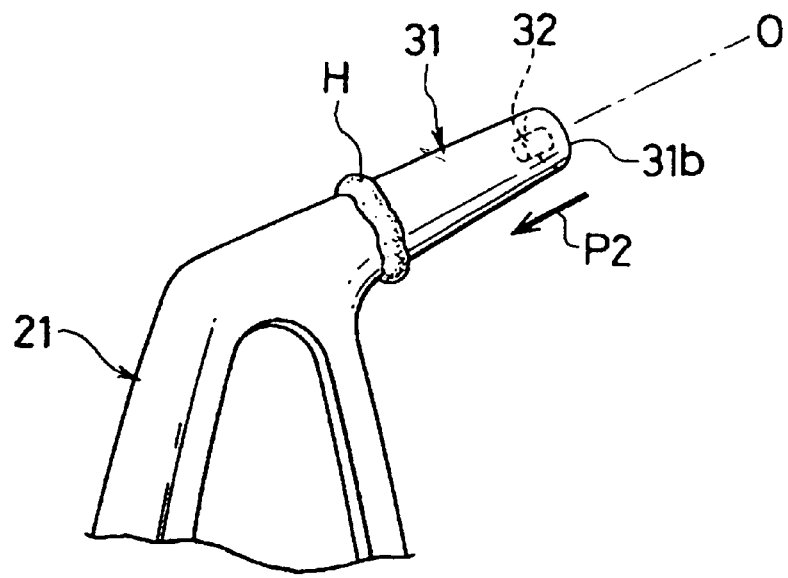
FIG. 6 shows the ball-striking member and hosel joined together according to the present invention.

When the respective joining end surfaces 21a and 31a of the ball-striking member 21 and hosel member 31 are heated by the heat of friction generated between the two joining end surfaces caused by the relative rotation of the hosel member 31 (or by the rotations of the hosel member 31 and ball-striking member 21), the rotation of the hosel member 31 is stopped; and then the hosel member 31 is pressed against the ball-striking member 21 by applying a further pressure P2 of approximately 10 tons, so that the respective joining end surfaces 21a and 31a of these two elements are joined or welded together, thus forming the two members into an integral, single unit as shown in FIG. 6.

Following this step, a thick portion H which is formed by the pressure crushing in the joint area a between the ball-striking member 21 and hosel member 32 is removed by grinding so as to smooth out the outer circumference of the joint area a.

Figure 7:
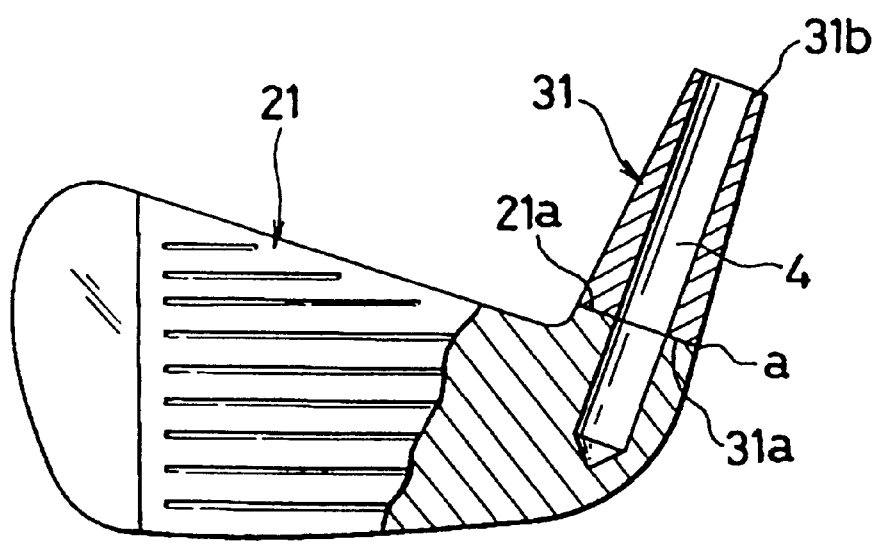
FIG. 7 is a vertical partial cross section showing the insertion hole formed in the club head main body.

Then, the insertion hole 4 into which a rod-form member such as the club shaft S and/or weight adjusting member W is to be inserted is formed as shown in FIG. 7 by boring the hosel member 31 from the other end surface 31b thereof so that the insertion hole 4 extends through the boundary between the hosel member 31 and ball-striking member 21.

In FIGS. 4 through 6, the reference numeral 32 is a preliminary hole which is formed beforehand in the other end surface 31b of the hosel member 31. The diameter of this preliminary hole 32 is smaller than the diameter of the insertion hole 4. Thus, the boring of the insertion hole 4 is facilitated, and the rotation and holding of the hosel member 31 on the central axis O is also facilitated.

As described above, in the present invention, the ball-striking part 2 and hosel 3 of the club head main body 1 are formed separately; the joining end surface 31a of the hosel 3 is abutted against the joining end surface 21a of the ball-striking part 21; and the respective members are caused to undergo relative rotation while being in a pressed contact, so that the respective joining end surfaces 21a and 31a are heated by the heat of friction between the joining end surfaces. After this heating step, the rotation is stopped; and the joining end surfaces 21a and 31a are pressed together by an application of a further pressure P2, thus joining or welding the surfaces together so that the respective members are formed into an integral unit. The ball-striking part 2 and hosel 3 are thus connected completely at the joint area a.

Furthermore, since the hosel member 31 is formed from a different type of metal material that has a small specific gravity which differs from the specific gravity of the material for the ball-striking member 21, the weight of the hosel 3 can be lightened. For example, when titanium (approximately 10 g) or a high-aluminum alloy (approximately 6 g) is used for the hosel member 31, the weight of the hosel member can be lightened by 20 to 30 g compared to an iron hosel member (approximately 40 g) which is formed integrally to the ball-striking member as in a conventional golf club head. Accordingly, the overall weight of the head can be lightened.

Moreover, since the insertion hole 4 is formed so as to pass through the joint area a between the ball-striking part 2 and the hosel 3, the reinforcement of the joint area a is increased by inserting therein the club shaft S, weight adjusting member W or reinforcing member. Furthermore, as a result of the reduction in the weight of the hosel 3 and the use of the weight adjusting member W, the position of the center of gravity of the head (i.e., the sweet spot) is lowered and can easily be set in the center of the face, so that a low center of gravity of the head can be accomplished.

Furthermore, for a head main body of this invention that has an overall weight which is the same as in a conventional golf club head, the weight equal to the amount by which the weight of the hosel 3 is reduced can be distributed around the periphery of the head, thus a wider spot on the club face is obtainable.

Moreover, since the ball-striking part 2 and hosel 3 of the club head main body 1 are separate members, the hosel 3 has interchangeability; thus, it is possible to use a desired and appropriate hosel that can meet the preference of the external appearance and club performance.

Furthermore, the concentration of stress in the club shaft can be relaxed by forming the hosel 3 by a material that has a low rigidity such as titanium, aluminum, etc. Accordingly, breaking of the club shaft can be prevented without using a protective means such as a ferrule or the like which is used in a conventional golf club head, and the cost of the golf club head can be reduced.

In the embodiments above, the ball-striking part 2 of the club head main body 1 may be obtained by welding together a plurality of split head pieces which are formed by forging; or the ball-striking part 2 of a single piece can be obtained by casting.

Furthermore, the invention is described for an iron club head; however, the method of the present invention can be used for other types of golf clubs such as a metal-wood club.

As seen from the above, according to the present invention, the ball-striking part and the hosel of a club head are formed separately, and the joining end surface of the hosel is abutted against the joining end surface of the ball-striking part, the respective members are caused to undergo a relative rotation under a pressing contact, so as to heat the respective joining end surfaces by the frictional heat generated between the joining end surfaces. Then, after this heating, the rotation is stopped; and the respective joining end surfaces are pressed together by an application of a further pressure, thus welding the surfaces together so that the two members are formed into an integral unit, producing a club head that has the ball-striking part and hosel completely joined together.

What is claimed is:

1. A method for manufacturing a golf club head in which a ball-striking part and a hosel part of a head main body of said golf club head are formed in separate members from different types of metal materials and joined together, said method comprising the steps ordered of:

abutting a flat joining end surface of said hosel part against a flat joining end surface of said ball-striking part, rotating said hosel part relative to said flat joining end surface of said ball-striking part in a state of pressing contact, applying a further pressure to said flat joining end surfaces so as to join said flat joining end surfaces, forming an insertion hole in the joined ball-striking member and hosel so that the insertion hole extends through the hosel into the ball-striking member passing through a joint area of the ball-striking member and hosel, and inserting a tip end of a club shaft into the insertion hole through the hosel and joint area and into the ball-striking member.

2. A method for manufacturing a golf club head according to claim 1, further comprising a step of forming a preliminary hole before said insertion hole is formed in said hosel part for facilitating the forming of the insertion hole, said preliminary hole being smaller in diameter than said insertion hole for said tip end of said shaft.

3. A method for manufacturing a golf club head comprising the steps of:

abutting a flat joining end surface of a hosel against a flat joining end surface of a ball-striking member, said hosel being made from a different type of metal material than said ball-striking member;

bringing said hosel and said ball-striking member into a relative rotational relationship under pressure being applied toward each other, thus heating said flat joining end surfaces of said hosel and ball-striking member, stopping said relative rotational relationship;

applying a further pressure to said flat joining end surfaces so as to join said flat joining end surfaces;

forming an insertion hole in the joined ball-striking member and hosel so that the insertion hole extends through the hosel into the ball-striking member passing through a joint area of said ball-striking member and hosel; and inserting a tip end of a club shaft in to the insertion hole through the hosel and joint area and into the ball-striking member.

4. A method according to claim 3, wherein said relative rotational relationship is obtained by rotating said hosel.

5. A method according to claim 3, wherein said relative rotational relationship is obtained by rotating said hosel and said ball-striking member.

6. A method according to claim 3, wherein said relative rotational relationship is obtained by a rotation of 500–3000 rpm.

7. A method according to claim 3, wherein said pressure applied in said relative rotational relationship is 3–5 tons.

8. A method according to claim 3, wherein said further pressure is approximately 10 tons.

9. A method for manufacturing a golf club head in which a ball-striking part and a hosel part of a head main body of said golf club head are formed in separate members from different types of metal materials and jointed together, said method comprising the steps of:

abutting a flat joining end surface of said hosel part against a flat joining end surface of said ball-striking part, rotating said hosel part relative to said flat joining end surface of said ball-striking part in a state of pressing contact, applying a further pressure to said flat joining end surfaces so as to join said flat jointing end surfaces, forming an insertion hole in the joined ball-striking member and hosel so that the insertion hole passes through the hosel into the ball-striking member passing through a joint area of the ball-striking member and hosel, and inserting a tip end of a club shaft and a weight adjusting member into the insertion hole through the hosel and joint area and into the ball-striking member.

10. A method for manufacturing a golf club head according to claim 1 wherein said insertion hole is longer than said hosel.

11. A method for manufacturing a golf club head according to claim 3, wherein said insertion hole is longer than said hosel.

12. A method for manufacturing a golf club head comprising the steps of:

abutting a flat joining end surface of a hosel against a flat joining end surface of a ball-striking member, said hosel being made from a different type of metal material than said ball-striking member;

bringing said hosel and said ball-striking member into a relative rotational relationship under pressure being applied towards each other, thus heating said flat joining end surfaces of said hosel and ball-striking member;

stopping said relative rotational relationship;

applying a further pressure to said flat joining end surfaces so as to join said flat joining end surfaces;

forming an insertion hole in the joined ball-striking member and hosel so that the insertion hole extends through the hosel into the ball-striking member passing through a joint area of the ball-striking member and hosel; and inserting a tip end of a club shaft and a weight adjusting member into the insertion hole through the hosel and joint area and into the ball-striking member.

13. A method for manufacturing a golf club head according to claim 1, further comprising the step of connecting said tip end of said club shaft to said ball striking member by an adhesive.

* * * * *